(12) United States Patent
Li

(10) Patent No.: US 6,846,076 B2
(45) Date of Patent: Jan. 25, 2005

(54) METHODS EMPLOYED IN SOLVENT-BASED INK JET PRINTING

(75) Inventor: Shulong Li, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 13 days.

(21) Appl. No.: 10/409,941

(22) Filed: Apr. 9, 2003

(65) Prior Publication Data

US 2004/0201661 A1 Oct. 14, 2004

(51) Int. Cl.[7] .................................................. B41J 2/01
(52) U.S. Cl. ...................................... 347/105; 347/101
(58) Field of Search ................................ 347/105, 101, 347/100, 96; 428/195, 32.1

(56) References Cited

U.S. PATENT DOCUMENTS

| | | | |
|---|---|---|---|
| 4,100,225 A | 7/1978 | Mueller | |
| 4,111,700 A | 9/1978 | Connick, Jr. et al. | |
| 4,366,299 A | 12/1982 | Dessaint | |
| 5,475,070 A | 12/1995 | Ashizawa et al. | |
| 5,516,578 A | 5/1996 | Coppens | |
| 5,867,197 A | 2/1999 | Aoki | |
| 5,976,673 A | 11/1999 | Aoki | |
| 6,153,263 A | 11/2000 | Haruta et al. | |
| 6,187,419 B1 | 2/2001 | Kijimuta et al. | |
| 6,200,667 B1 | 3/2001 | Haruta et al. | |
| 6,224,204 B1 * | 5/2001 | Aoki | 347/101 |
| 6,387,999 B1 | 5/2002 | Dirschl et al. | |
| 6,391,807 B1 | 5/2002 | Jariwala et al. | |
| 6,406,775 B1 | 6/2002 | Houde | |
| 6,467,898 B2 * | 10/2002 | Codos et al. | 347/102 |

OTHER PUBLICATIONS

Surface Chemistry Theory and Industrial Applications; Lloyd I. Oslpow; pp. 232–235.
Pending Patent Application filed Apr. 9, 2003; Li, Shulong; Express Mail No. EV 229672391 US; Case No. 5545; Products and Compositions Employed in Solvent–Based Ink Jet Printing.

* cited by examiner

*Primary Examiner*—Manish Shah
(74) *Attorney, Agent, or Firm*—Terry T. Moyer; John E. Vick, Jr.

(57) ABSTRACT

A porous substrate for organic solvent-based ink printing may be coated with a repellant composition to form a coated substrate surface that is suitable for high quality solvent-based ink jet printing. The coated substrate surface may exhibit a repellancy for butoxyethyl acetate solvent at a contact angle of between about 40 and about 90 degrees at ambient temperature. In some applications, the repellant composition includes a fluorocarbon polymer, or a urethane. Solvent-based ink applied to the porous substrate will form droplets which under the application of heat deposit ink in a controlled and advantageous manner upon the treated substrate surface. An optional acrylate-based latex material may be employed in the repellant composition. A printed substrate is produced which exhibits clear, sharp and high quality print.

33 Claims, 2 Drawing Sheets

DESIRABLE SHARP AND BRIGHT PRINT

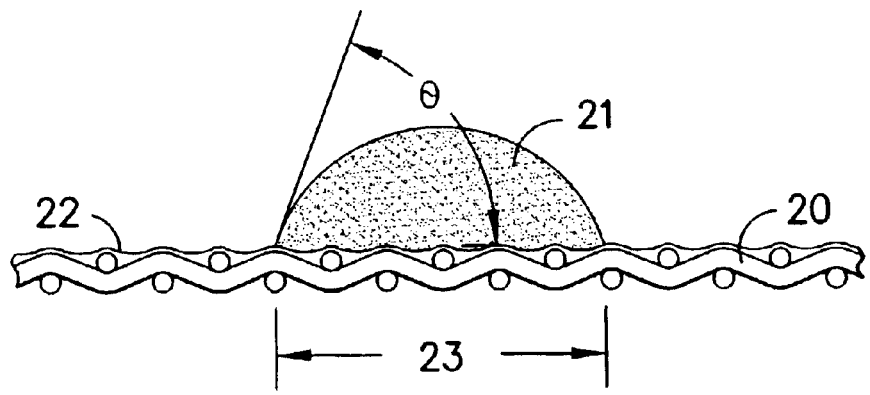
FIG. -1-
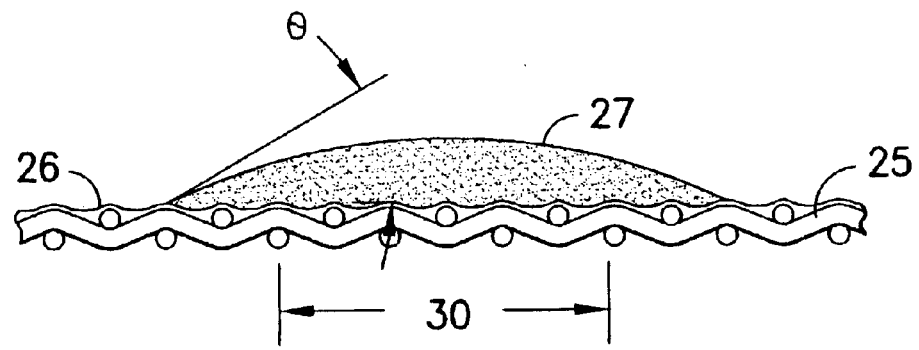
FIG. -2-
INSUFFICIENT REPELLANCY
LOW CONTACT ANGLE
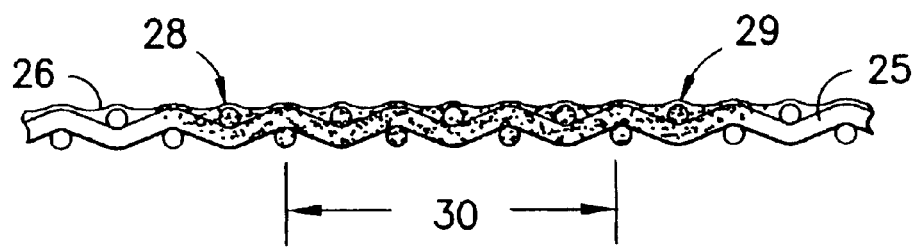
FIG. -2A-
BLURRED IMAGE

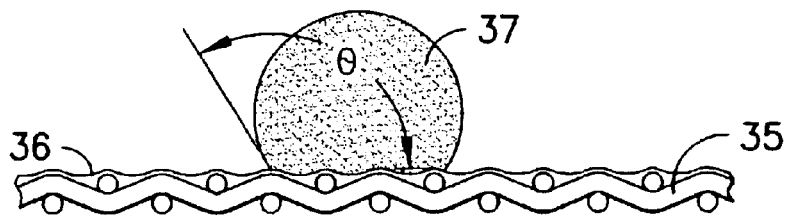
FIG. -3-
EXCESSIVE REPELLANCY
HIGH CONTACT ANGLE
FIG. -3A-
DULL IMAGE
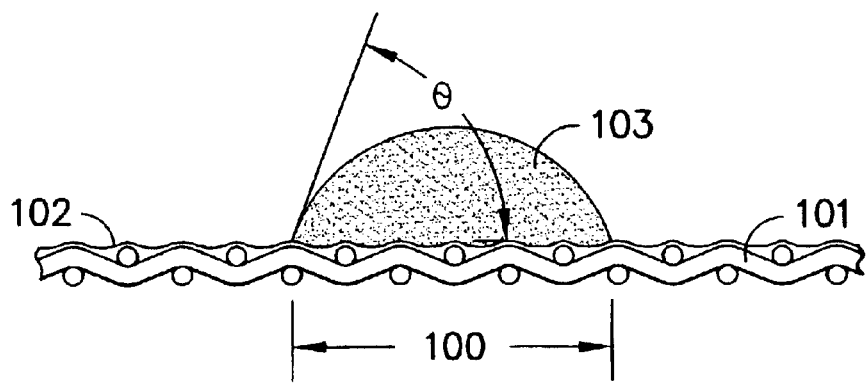
FIG. -4-
DESIRABLE CONTACT ANGLE
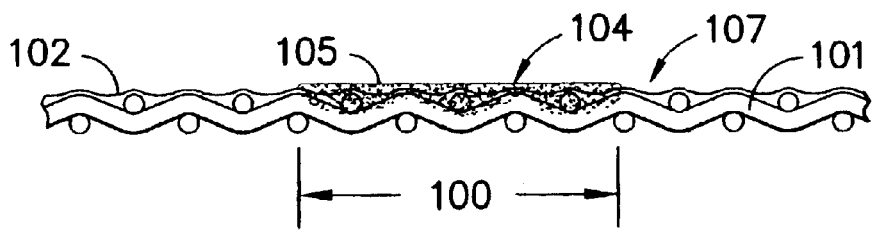
FIG. -4A-
DESIRABLE SHARP AND BRIGHT PRINT

METHODS EMPLOYED IN SOLVENT-BASED INK JET PRINTING

BACKGROUND OF THE INVENTION

Images and design patterns may be placed upon substrates by various methods, including organic solvent-based ink jet printing. Ink jet printing is the process of placing predetermined quantities of a solvent-based material ("ink") containing a colorant upon a substrate in predetermined target matrix zones of a substrate. Solvent-based ink jet printing employs organic carbon-containing solvents to carry colorants, or ink, to the surface of printing substrates. Substrates commonly employed in solvent-based ink jet printing include nonporous plastic films, plastic sheets, and coated fabric. However, many of such substrates are impervious to air, nonporous, undesirably stiff, and relatively expensive.

Efforts have been made to employ flexible or porous textile substrates for solvent-based ink jet printing. Numerous applications exist for such products, including graphic artwork, signage, banners, flags, and various types of decorative textile materials. It also would be desirable to form a repellant surface on such printed materials, to render the surface of such materials impervious or resistant to liquids, including water and oily staining substances.

Unfortunately, efforts to apply high quality solvent-based ink jet images to flexible fibrous textile substrates have met with only limited success. Porous textiles, when subjected to solvent-based inks, often reveal a poor quality printed image. Organic solvents used to carry the ink to the textile substrate surface often undesirably wick into the porous structure of the textile. Such wicking results in undesirable ink feathering and relatively poor color density.

Ionic-based chemical treatments have been used in some instances to remedy deficiencies in aqueous-based ink jet printing. Some treatments fix in place the ink or colorant upon the surface of fibers in the textile, resulting in less undesirable ink expansion, and a sharper printed image. However, such ionic-based treatments are not readily suitable for solvent-based inks in part because colorants employed in organic solvent-based inks usually are not highly ionic. Therefore, ionic-based chemical treatments are not well suited to solve the problem of poor print quality in solvent-based printing systems.

For example, FIG. 2A shows a solvent-based printed textile 25 with an undesirably blurred image. Such an undesirable image is due in part to the nature of the textile coating 26 applied to the textile 25 which has an undesirably low degree of repellency. The undesirably low repellency of the coating 26 is evident by observing the low contact angle θ of the solvent droplet 27 upon the textile 25, as seen in FIG. 2. FIG. 2 shows the solvent-based ink droplet 27 just prior to its evolution into the textile 25. FIG. 2A therefore illustrates an undesirably broad ink deposition resulting from deposition of the droplet 27 of FIG. 2 into textile 25, resulting in a blurred printed image. The organic solvent of solvent-based ink droplet 27 shown of FIG. 2 has left ink deposits 28–29 (FIG. 2A) well beyond the target printing zone 30, leaving a blurred image upon textile 25.

FIG. 3A illustrates a solvent-based printed textile 35 with a dull image. The dull image is caused in part by the undesirable deposition of ink 38 deep into the textile 35 well below the upper surface 39 of the coated textile 35. FIGS. 3–3A illustrate the result of excessive repellency exhibited by the repellant coating 36 upon the textile 35. The solvent-based ink droplet 37 (see FIG. 3) which experiences excessive repellency has a high contact angle θ which is greater than 90 degrees. When ink within such a droplet 37 eventually merges (usually by heat) into the textile 35, an undesirably deep deposition of ink 38 is experienced, forming a dull image upon textile 35.

A composition and method for treating a porous textile substrate to render the substrate capable of receiving organic solvent-based ink in producing a sharp and vivid image would be very desirable. A porous substrate having a repellant coating which reveals a desirable degree of repellency with an appropriate solvent contact angle, enabling production of a high quality sharp and bright printed image, is needed. It would be very helpful if such a printed substrate were capable of repelling liquids such as water and oily staining substances.

SUMMARY OF THE INVENTION

Surprisingly, it has been discovered that a porous substrate for organic solvent-based ink may be coated with a repellant composition to form a coated substrate surface suitable for high quality solvent-based ink jet printing. The coated substrate surface may exhibit a repellency for butoxyethyl acetate solvent at a contact angle of between about 40 and about 90 degrees at ambient temperature. In some applications, the repellant composition includes an optional acrylate-based latex material. Fluorocarbon-containing compositions are particularly useful in repellant compositions for coating the substrate. Other compositions or additives may be employed as well, as further described herein.

In other desirable embodiments of the invention, the contact angle for the coated substrate is between about 60 and about 80 degrees, an angle that has been found in some instances to form a particularly bright and sharp image. The coated substrate surface of the substrate may be adapted for supporting an unabsorbed organic solvent-based ink droplet upon said coated substrate surface at temperatures below about 35 degrees Centigrade.

An ink jet printed article manufactured according to the invention is comprised of a porous ink jet printing substrate. This substrate may be coated with a repellant composition to produce a repellency for butoxyethyl acetate having a contact angle between about 40 and about 90 degrees at ambient temperature. Butoxyethyl acetate is a common solvent employed in organic solvent-based inks. A solvent-based ink may be printed upon said coated substrate surface.

An ink jet printing method also is presented herein. In the method, a porous substrate receives a repellant composition, thereby forming a coating upon the substrate. In some applications, the repellant composition is a fluorocarbon-containing material. The surface of the coating has a degree of repellency that is capable of supporting a butoxyethyl acetate droplet having a contact angle of between about 40 and about 90 degrees at ambient temperature. Also, a final step optionally may include printing upon the coated substrate with an ink jet printer a quantity of solvent-based ink to produce a desirable printed image.

BRIEF DESCRIPTION OF THE DRAWINGS

A full and enabling disclosure of this invention, including the best mode shown to one of ordinary skill in the art, is set forth in this specification. The following Figures illustrate the invention:

FIG. 1 is an illustration of the contact angle θ experienced by a solvent droplet upon the surface of a coated textile, in contrast to FIGS. 2, 2A, 3, and 3A which illustrate undesirable conventional textiles and methods, as further discussed herein;

FIG. 4 illustrates a highly desirable contact angle which may be achieved by an applied solvent-based droplet when a substrate has been previously coated with repellant compositions of the invention; and FIG. 4A shows a deposition of ink upon the substrate of FIG. 4 which results in a desirable sharp and bright printed image correctly placed with a targeted printing zone.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

It has been discovered that chemical treatment of a porous textile with a coating containing in part a repellant composition affords a coated substrate having a particular repellancy that is capable of generating a high print quality. The repellancy achieved by the substrate once it receives the coating upon its surface may reveal a contact angle using butoxyethyl acetate solvent of between about 40 and about 90 degrees at ambient temperature.

FIGS. 4 and 4A show one application of the invention in which a desirable contact angle is achieved by employing compositions which provide the correct amount of repellancy to a substrate surface. In FIG. 4, a substrate 101 has been coated with a repellant composition 102 upon its surface. A solvent-based ink droplet of butoxyethyl acetate solvent 103 is shown applied to an area of the substrate 101 that is intended for target printing zone 100. The droplet 103, due to the degree of repellancy of the repellant composition 102 upon which it rests, achieves the contact angle θ as shown in the FIG. 4. A full description of contact angle, its measurement and its magnitude, is provided in this specification.

FIG. 4A shows the invention of FIG. 4 at a later point in time, after the droplet 103 has deposited ink 105 upon the surface of substrate 101, thereby forming a sharp and bright print 104 upon the surface of the substrate 101. The print 104 is desirably within the target zone 100, and is not blurred beyond the boundaries of target zone 100. Furthermore, print 104 comprises ink 105 which rests in a position near the upper surface 107 of the substrate, affording a relatively clear and bright printed image.

In the practice of the invention, organic solvent-based ink is received upon the surface of the coated substrate. Later, upon heating, solvent is evaporated to facilitate deposition of the remaining ink upon the substrate to obtain a bright and high quality image. In one application of the invention, the substrate is a porous textile. In many instances, a porous textile having air permeability will be employed. The textile or substrate employed may be comprised of synthetic, natural, regenerated fibers, or blend of such fibers. Synthetic fibers may include polyester, nylon, acrylic, polyolefins, glass, acetate, polyaramide, polyketone, or others. Natural fibers that may be employed in the substrate of the invention include include cotton, wool, and silk. Regenerated fibers that may be used include rayon, and perhaps others as well.

It has been found that a chemical coating applied to the porous textile substrate revealing a contact angle of 40–90 provides the most advantageous print quality. In yet another embodiment of the invention, a contact angle of about 60–80 degrees has been found to produce particularly desirable results for certain repellant compositions. Printed textiles made using the treated, coated substrates typically exhibit excellent print quality with very good water and oil repellancy. The printed textiles are resistant to dirt, staining, rain, and rough handling.

In some instances, print quality is maximized when a relatively low drying temperature is used in the printing process. Contact drying may be used in a solvent-based ink jet printer. The drying temperature used can be as high as 200 degrees Fahrenheit in evaporating solvent from the textile surface. A drying temperature below about 80 degrees Centigrade increases the desirable oil repellancy of the fluorocarbon and results in less ink "feathering". Feathering is the undesirable spreading of the printed image beyond the intended boundary or target zone of the print. In some applications, a drying temperature of less than about 60 degrees Centigrade is preferred.

Repellant Polymeric Compositions

Repellant compositions useful in the present invention may include, for example, any of the fluorochemical radical-containing polymeric and oligomeric compounds known in the art to impart dry soil resistance and water and oil repellency to fibrous or textile substrates.

In some applications of the invention, polymeric or oligomeric fluorochemical treatments applied in the repellant composition may include one or more fluorochemical radicals containing a perfluorinated carbon chain having from 3 to about 20 carbon atoms, more preferably from about 6 to about 14 carbon atoms. Such fluorochemical radicals may contain straight chain, branched chain, or cyclic fluorinated alkylene groups or any combination thereof. In some applications of the invention, the fluorochemical radical contains from about 40% to about 80% fluorine by weight, and in yet other applications about 50% to about 78% fluorine by weight.

Representative fluorochemical compounds useful as treatments in the present invention include fluorochemical acrylate and substituted acrylate homopolymers and copolymers containing fluorochemical acrylate monomers, methyl methacrylate, butyl acrylate, octadecylmethacrylate, acrylate and methacrylate esters of oxyalkylene and polyoxyalkylene polyol oligomers (e.g., oxyethylene glycol dimethacrylate, polyoxyethylene glycol dimethacrylate, methoxy acrylate, and polyoxyethylene acrylate), glycidyl methacrylate, ethylene, butadiene, styrene, isoprene, chloroprene, vinyl acetate, vinyl chloride, vinylidene chloride, vinylidene fluoride, acrylonitrile, vinyl chloroacetate, vinylpyridine, vinyl alkyl ethers, vinyl alkyi ketones, acrylic acid, methacrylic acid, 2-hydroxyethylacrylate, N-methylolacrylamide, 2-(N,N,N-trimethylammonium)ethyl methacrylate, and 2-acrylamido-2-methylpropanesulfonic acid (AMPS), fluorochemical urethanes, ureas, esters, ethers, alcohols, epoxides, allophanates, amides, amines (and salts thereof), acids (and salts thereof), carbodiimides, guanidines, oxazolidinones, isocyanurates, and biurets.

Blends of these compounds are also considered useful in the application of the invention. Fluorine-containing acrylate copolymers, fluorine containing urethanes, and their blends with other organic and inorganic compounds are particularly suitable compositions for the repellant compositions of the invention.

Also useful in the present invention as substrate treatments are blends of the repellant compositions with fluorine-free extender compounds, such as siloxanes, acrylate and substituted acrylate polymers and copolymers, N-methylolacrylamide-containing acrylate polymers, urethanes, blocked isocyanate-containing polymers and oligomers, condensates or precondensates of urea or melamine with formaldehyde, glyoxal resins, condensates of fatty acids with melamine or urea derivatives, condensation of fatty acids with polyamides and their epichlorohydrin adducts, waxes, polyethylene, chlorinated polyethylene, alkyl ketene dimers, esters, and amides. Blends of the these fluorine-free extender compounds are also considered useful in the present invention. The relative amount of the extender compounds in the treatment is not critical to the present invention.

Many treatments, including treatment blends that include fluorine-free extender molecules such as those described above, are commercially available as ready-made formulations. Such products are sold, for example, as Scotchgard™,. brand Carpet Protector manufactured by 3M Co., Saint Paul, Minn., and as Zonyl™ brand carpet treatment manufactured by E.I. du Pont de Nemours and Company of Wilmington, Del.

Acrylic latex materials may be employed in a concentration level of between about 0.01 and 20 percent by weight of the overall coating composition.

Compositions suitable for treating a textile to achieve butoxyethyl acetate droplet contact angle of about 40–90 degrees may include fluorinated compounds and blends of fluorinated compounds with other organic and inorganic compounds.

Fluorinated compounds, for example, may include those having the following general formula:

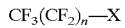
$CF_3(CF_2)_n$—X wherein n greater than or equal to 1; and X is comprised of a carbon-containing composition, or alternately another radical. Particularly useful compositions for application as components of repellant compositions in the invention include synthetic fluorinated condensation polymers and addition polymers containing the $CF_3(CF_2)_n$—X radical. The X group may be any of the following, as examples: —$CH_2CH_2O$—R, wherein R is an acyl or ester group; —$SO_2$—NH—R; wherein R is an acyl or ester group; and —COOR, wherein R is an acyl group.

The repellant composition used in treating the substrate may be employed in the form of aqueous emulsion or dispersion, with or without an added minor amount of organic solvent. After the treatment is applied to the textile, water and organic solvent may be evaporated to leave the non-volatile fluorinated composition on the textile surface. The fluorinated radical $CF_3(CF_2)_n$— usually provides a sufficient repellency and high contact angle such that a solvent droplet will not become undesirably absorbed into the textile prior to heating of the textile. In general, measured and relatively gradual absorption of an ink droplet during heating provides the greatest opportunity for a sharp, clearly defined ink deposition into the substrate, resulting in a superior image.

In some particular embodiments of the invention, the repellant composition comprises a fluorinated polymer, such as for example a perfluoroacrylate species. One perfluoroacrylate species which may be employed in one aspect of the invention is shown by the formula:

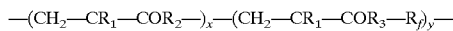
—$(CH_2$—$CR_1$—$COR_2$—$)_x$—$(CH_2$—$CR_1$—$COR_3$—$R_f)_y$— wherein $R_1$ is selected from the group consisting of: aliphatic radicals, halogen-containing radicals, nitrogen-containing radicals, sulfur-containing radicals, oxygen-containing radicals and aromatic radicals;

wherein $R_2$ is selected from the group consisting of alkyls, aromatic groups, oxygen-containing radicals, sulfur-containing radicals, and nitrogen-containing radicals;

wherein $R_3$ is selected from the group consisting of alkyls, aryls, sulfur-containing radicals, oxygen-containing radicals, nitrogen-containing radicals, phosphorous-containing radicals, and silicon-containing radicals;

wherein x is greater than or equal to 1; and wherein y is greater than or equal to 10.

In the application of the above referenced perfluoroactrylate species, it has been found that a concentration of about 0.01 to about 5 percent by weight of the species in the overall coating composition is useful.

Examples of these and other fluorinated compounds that may be suitable for application in this invention are described in U.S. Pat. Nos. 6,391,807; 6,387,999; 5,516, 578; 5,475,070; 4,111,700; 4,100,225, and 4,366,299.

In general, the higher the fluorine content of the particular fluorocarbon-containing component which is used, the higher the contact angle that may be achieved. The contact angle also is affected by other constituents present in such compositions.

Organic solvent-based inks and ultraviolet light curable inks are suitable in the application of the invention for excellent ink jet printing. Organic solvents typically used in a solvent based ink include butoxyethyl actetate, cyclohexanone, dipropylene glycol monomethyl ether, propylene glycol monomethyl etheracetate. Other organic solvent may also be used. The ink also may contain small amount of pigment (usually less than 10% by weight) and resin binder (less than about 20% by weight). In an ultraviolet curable ink, most of the ink composition is a ultraviolet curable monomer or oligomer, or a blend. A pigment or dye is also included in many such ink compositions.

Non-fluorinated repellant materials which when applied to a fabric result in a contact angle of between about 20 and 90 also may be suitable for application in the invention. However, fluorine-containing materials, such as perfluoroacrylate polymers, fluorinated urethanes, polytetrafluoroethylene and its copolymers, and the like, are in general preferred treatment compositions.

A fluorine-containing compound may be blended with other organic or inorganic materials before applying to a fabric as a treatment. For example, a perfluoroacrylate polymer latex can be blended with a butyl acrylate based latex for form a treatment formula. The formula is then applied to a substrate. To preserve the characteristics of a substrate, the treatment add-on is 20% or less based on the dry weight of the fabric, preferably 10%, more preferably, 5% or less. Furthermore, the treatment should not detrimentally effect the softness and surface touch of the fabric. The glass transition temperature of a polymeric resin suitable for this treatment needs to be about 100 Centigrade or less. It is usually preferred that the treatment is applied in a form of water emulsion or dispersion.

Method of Application

In one embodiment of this invention, a water repellent and oil repellent agent is used which affords a printed substrate with water repellent and oil repellent characteristics. Textiles or fabric with such water and oil repellent characteristics have improved weather stability and stain resistance.

By treating a textile substrate with a fluorocarbon material so that the contact angle of the solvent (or ink-containing droplet) on the treated fabric is between about 40 and 90 at room (ambient) temperature, a sharp and vivid print may be obtained.

For purposes herein, ambient temperature usually is considered to be about 70 degrees F., plus or minus about 10 degrees F. In some applications, it is desirable that an organic solvent-based ink droplet laid on the surface of the textile remain as a liquid drop on the fabric surface at room (or ambient) temperature, and only become absorbed into the fabric when heated to about 35 degrees Centigrade or higher. Thus, the contact angle of a solvent droplet on the fabric at 35 Centigrade or higher may be reduced to zero as the ink is heated, facilitating the deposition of the ink of the droplet into the textile. Furthermore, when a solvent ink drop becomes absorbed into the fabric at about 35 degrees Centigrade or higher, the solvent ink drop desirably remains in the same area of target contact, with very little wicking or spread along the yarn or fiber outside of the intended zone of inking. It has therefore been discovered that by affording a coating which has a repellancy providing a specific and desirable contact angle, the solvent-based ink is favorably deposited into the textile, forming a desirable image.

Employment of a contact angle (further described herein) higher than about 90 usually doesn't allow effective wetting of ink on the surface of the fabric, resulting in a dull print as seen in FIGS. 3–3A. Conversely, a contact angle of lower than about 20 often results in ink wicking into fabric and an undesirably blurred print, as seen in FIGS. 2–2A, and previously described.

The repellancy composition or coating may be applied to the fabric by impregnation, coating, spray, and other methods known in the art. It is desirable that a textile fabric be impregnated with the treatment solution or emulsion, followed by drying to remove the solvent or water. Drying may be commenced by convective heating to efficiently remove water and to cure the treatment with heat in the temperature range of about 50 degrees Centigrade to about 250 Centigrade for improved treatment durability and water repellency.

It is indeed surprising that in the application of the invention, a printing process with solvent-based ink on top of such a coating does not mask or reduce water and oil repellency of the final printed textile product. That is, application of solvent-based ink unexpectedly provides a sharp well defined image, and without reducing the overall effectiveness of the repellancy of fluorocarbon-based coatings underneath the printed ink image.

In some applications of the invention, a treated substrate may be laminated with a paper to provide stiffness and flatness before loading onto an ink jet printer. Lamination to an air impermeable paper is sometimes necessary for the printing process. Due to the porous nature of the fabric, a slightly higher amount of ink lay-down is needed as compared to ink amount for air impermeable vinyl substrates in order to produce sufficient coloration.

Solvent ink jet printers typically are fitted with a heated dryer section to remove (evaporate) the organic solvent after printing. It is preferred that the drying temperature be between 40 degrees Centigrade and 100 degrees Centigrade, and more preferably between 50 and 70 degrees Centigrade. In any event, it has been found in the application of the invention that heating at a temperature of less than about 60 degrees Centigrade may provide advantageous results. It is a goal of the invention to facilitate ink droplets on the textile substrate becoming absorbed into the fabric without significant amounts of undesirable wicking when the fabric is heated. This facilitates fast and efficient drying because the porous air permeable substrate structure provides a relatively large surface area for solvent evaporation.

The use of certain ink jet printers, such as a Vutek 2236™ brand printer, available from the Vutek, Inc. of Meredith, N.H. 03253 may provide an option of preheating the textile substrate before printing. However, it is usually preferred that the pre-heater is inactivated in such printing devices to avoid premature ink wicking of solvent-based ink into the substrate.

In one application of the invention, a method for preparing a substrate to receive an organic solvent-based ink is provided. First, a repellant composition is applied to a porous substrate to form a repellant coating upon the substrate. Then, the coating is rendered capable of providing a contact angle for a solvent-based ink droplet of between about 40 and 80 degrees at ambient temperature. The repellant composition may include a fluorocarbon-containing polymer, such as for example, a perfluoroacrylate species.

The treated substrate also may be used to improve the print quality of an ultraviolet (UV) cured ink jet print. In a typical UV cure ink jet printing process, a fairly low viscosity (usually about 1–100 centipoise) ink, containing UV cure-able monomer or oligomer, is dropped upon the textile substrate. This may be followed by high intensity UV radiation to cure the oligomer or monomer. Textile substrates treated in the practice of the invention may hold ink droplets in place until the printed sections are positioned with access to the UV radiation for curing. Without the treatment, the low viscosity ink may undesirably wick into the fabric resulting ink feathering and blurred print.

Contact Angle

Contact angle $\theta$ is a quantitative measure of the wetting of a solid by a liquid. It is typically defined geometrically as the angle formed by a liquid at the three phase boundary where a liquid, gas and solid intersect. The contact angle is the angle included between the tangent plane to the surface of the liquid and the tangent plane to the surface of is the solid, at any point along their line of contact. When a drop of a liquid rests upon a solid surface, the drop may be considered as resting in equilibrium by balancing the three forces involved.

Low values of contact angle $\theta$ indicate that the liquid spreads, or wets to a relatively large extent, while excessively high values indicate relatively poor wetting. In the context of this invention, contact angle is determined by the nature and degree of repellancy of an applied coating to a textile substrate. If the contact angle $\theta$ is less than about 90 the liquid is said to wet the solid. Contact angles of less than about 40 degrees tend to produce undesirable blurring of an image when applied to textile or porous substrates. If the contact angle is greater than about 90 it is said to be non-wetting. A zero contact angle represents complete wetting.

Some applications of the invention employ a contact angle of between about 60 and 80, while others use an angle between about 70 and 85, depending upon the formulation.

This angle may be seen in FIG. 1. FIG. 1 illustrates a woven textile 20 which has received upon its surface a repellant coating 22. The coating enables a solvent-based ink droplet to be supported in a manner to reveal a contact angle $\theta$.

Procedure and Equipment for Measuring Contact Angle

The Sessile drop (static) optical contact angle method is used herein to estimate wetting properties of a localized region on a solid coated textile surface. Angle between the baseline of the drop and the tangent at the drop boundary is measured by a Kruss DSA 10 Contact Angle Measuring System, comprised of a machine and associated equipment marketed and sold by Kruss GmbH of 85-99a, Borsteler Chaussee, Hamburg, Germany.

In the measurement of the static contact angle, the surface of the coated solid textile to be measured should be as flat as possible. A drop of liquid with a diameter of about 2–6 mm is deposited on the solid with the aid of a syringe. In this order of magnitude of the contact angle to be measured does not depend on the diameter of the drop.

The contact angle is however by no means time independent. Depending upon the liquid used the contact angle can change within seconds or minutes. The causes of the alteration are the dissolving capacity of the solid in the liquid, the alteration in the composition of the liquid or sedimentation effects.

The DSA1 program determines the baseline with the aid of the mirror image of the drop produced by reflection at the sample surface. In this procedure, care should be taken to ensure that the mirror image is as clear as possible. With sample surfaces that do not reflect very well it is normally possible to improve the mirror image by altering the sample stage inclination (Tilt). If it is not possible to obtain a mirror image then the program will not be able to find the baseline automatically. In this latter instance, the baseline must be set manually.

If the drop image is dark or poor in contrast such that it is difficult to determine the baseline visually, then one may attempt to increase the contrast by adjusting the framegrabber settings.

A three (3) inch diameter textile fabric swatch which is coated with the repellant compositions of the invention was fitted upon an embroider's ring to obtain a flat fabric surface. The substrate samples then were placed on the horizontal platform of the Kruss Drop Shape analysis instrument. A 10 microliter pure liquid drop of butoxyethyl acetate (purchased from Aldrich Chemicals) was laid on the fabric while the instrument captured the image of the droplet on the fabric surface for about 30 seconds.

Experimental Procedure in Examples

The static contact angle of butoxyethyl acetate on textile fabric was determined using the Kruss image analysis program. Of all the samples tested, it was observed that either a stable contact angle occurred within the 30 seconds time window, or a constantly decreasing contact angle was observed until the droplet became completely absorbed into the coated textile fabric. In the latter case, a contact angle of zero degrees was assigned.

A syringe loaded with an solvent ink jet ink, UltraVu 3™ (from Inkware Inc.) was used to drop a 3–5 microliter sized ink drop on a swatch of fabric on a horizontal surface at room temperature. Then, a one minute delay was initiated, followed by careful observation of the droplet to determine if the droplet remained as a droplet or spreads out and wicks into the substrate. If the droplet did not wick into the substrate, the substrate with a solvent drop on the surface was carefully placed horizontally onto a hot plate with surface temperature set at about 50 Centigrade for another few minutes. Observations were made to determine if the drop absorbed into the textile. The textile was then removed from the heat, and it was noted in Table 1 the manner in which the color was distributed on the fabric. If an ink drop left a roughly round small circle with a relatively sharp edge, and intense uniform color inside the circle, the textile was deemed capable of affording a sharp and vivid print on an organic solvent-based ink jet printer. If the ink drop left a relative large circle with feathery edges or "bleeding", or a light color inside the circle, the textile was deemed to yield an undesirable print.

A good water repellency was indicated if droplets formed a roughly spherical shape (indication of high contact angle) without spreading or wicking into the fabric, and the drop could easily roll off of the substrate when the fabric was tilted. For an oil repellency test, a disposable pipette was used to lay one drop of mineral oil and one drop of corn oil upon a coated textile fabric in both the printed and not printed areas. If the oil drop remained as roughly a liquid sphere without spreading or wicking into the fabric, a good oil repellency was assigned.

For examples listed below, about 2 parts by weight of compositions listed in the first column of the Table 1 were mixed with about 98 parts by weight of water to make a 2% (by weight) water solution, unless otherwise specified.

A 100% white polyester poplin substrate which had been previously scoured and heatset was impregnated with the repellancy composition solution as set forth below for each example, and then passed through a pair of nip rolls at a nip pressure of about 40 psi to achieve a wet pickup by weight of about 60% (based on the dry weight of the substrate substrate fabric). The substrate was then placed into a convection oven at 350 degrees Fahrenheit for about 3 minutes to dry and cure.

EXAMPLE 1

Repearl SR 1100™ was employed in the repellant composition. Repearl SR 1100™ is a fluoropolymer-containing emulsion obtained from Mitsubishi Chemical Corporation. The chemical identity of the active fluorocarbon-containing polymer of Repearl SR 1100™ is believed to contain perfluorinated acrylate and hydrophilic comonomers, with fluorine content of 5%.

About 2 parts by weight of Repearl SR 1100™ was mixed with about 98 parts by weight of water to make a 2% (by weight) aqueous solution in this example.

EXAMPLE 2

Two different chemical species were employed in the repellant composition of this particular example. Rhoplex K3™ was employed in the repellant composition, which is an acrylic emulsion that may be obtained from Rohm and Haas Company. The chemical identity of the active acrylic-containing polymer of this material is believed to be a copolymer of butyl acrylate and other acrylic comonomers.

Repearl F8025™ was employed in the repellant composition. Repearl F8025™ is a perfluoroacrylate latex that may be obtained from Mitsubishi Chemicals, containing 12% fluorine.

About 10% by weight of Rhoplex K3™ was mixed with about 2% by weight of Repearl F8025™, with the balance of the solution being water.

EXAMPLE 3

Nuva DFA™ was employed in the repellant composition, which is a fluoropolymer-containing emulsion that may be obtained from Clariant Corporation. About 2 parts by weight of Nuva DFA™ was mixed with about 98 parts by weight of water to make a 2% (by weight) aqueous solution.

EXAMPLE 4

Myafax S-215™ was employed in the repellant composition. Myafax S-215™ is a fluoropolymer-containing emulsion that may be obtained from Peach State Labs, Inc. in Rome, Ga.

About 2 parts by weight of Myafax S-215™ was mixed with about 98 parts by weight of water to make a 2% (by weight) aqueous solution.

EXAMPLE 5

Two species were employed in this example. Repearl F89™ was employed, which is a fluoropolymer-containing emulsion that may be obtained from Mitsubishi Chemicals. The chemical identity of the active fluorocarbon-containing polymer is believed to be fluoroalkyl urethane oligomer polymer emulsion with a total fluorine content of about 8%.

The second species used in this example was Rhoplex K3™, previously described. An aqueous solution having about 2% by weight of Repearl F89™ and about 5% by weight Rhoplex K3™ was prepared and used, with the balance of the solution being water.

EXAMPLE 6

Repearl F89™ was employed in the repellant composition. About 2 parts by weight of Repearl F89™ was mixed with about 98 parts by weight of water to make a 2% (by weight) aqueous solution. The substrate used in this example was a polyester poplin which exhibited somewhat more texture (bulk) than the substrate employed in previous examples.

EXAMPLE 7

Repearl F89™ was employed in the repellant composition, in a concentration of about 2 parts by weight with about 98 parts by weight of water to make a 2% (by weight) aqueous solution.

EXAMPLE 8

This example used the same composition as provided above in Example 7, with the exception that the concentration of Repearl F89™ was a 3% (by weight) aqueous solution.

EXAMPLE 9

Repearl F320A™ was employed in the repellant composition. Repearl 320A™ is a fluorocarbon emulsion that may be obtained from Mitsubishi Chemicals. The chemical identity of the active ingredient of Repearl F320A™ is believed to be fluoroalkyl urethane oligomer, with fluorine content of 8%.

About 2 parts by weight of Repearl F320A™ was mixed with about 98 parts by weight of water to make a 2% (by weight) aqueous solution.

EXAMPLE 10

In this example, no repellant composition was provided on the substrate fabric.

EXAMPLE 11

Rhoplex K3™ was employed in the repellant composition, which has been previously described above. The Rhoplex K3™ was applied in about 2 parts by weight with about 98 parts by weight of water added to make a 2% (by weight) aqueous solution.

TABLE 1

| Example | Contact Angle of Butoxyethyl Acetate | Observations During Contact Angle Measurement | Observation of Ink Droplet |
|---|---|---|---|
| 1 | Initially 80, then 0 within one minute. | A solvent drop beads up initially, then slowly spreads out and becomes absorbed into the fabric at ambient temperature. | Some ink bleeding. |
| 2 | 80 | A solvent drop stayed on the fabric surface until heated to ~40–50 C., then drop was soaked into the fabric. | No ink bleeding. |
| 3 | Initially 80, then 0 within 30 seconds. | Solvent drop beads up initially, then slowly spread out and get absorbed into the fabric at room temperature. | Some ink bleeding. |
| 4 | Initially 77, then 0 within 30 seconds. | Solvent drop beads up initially, then slowly spread out and get absorbed into the fabric at room temperature. | Some ink bleeding |
| 5 | 83 | Solvent drop stayed on the fabric surface until heated to ~40–50 C., the drop was then soaked into the fabric. | No ink bleeding. Relatively high color saturation. |
| 6 | 63** | Solvent drop stayed on the fabric surface until heated to ~40–50 C., the drop was then soaked into the fabric. | No ink bleeding, relatively high color saturation. |
| 7 | 76 | Solvent drop stayed on the fabric surface until heated to ~40–50 C., the drop was then soaked into the fabric. | No ink bleeding, relatively high color saturation |
| 8 | 74 | Solvent drop stayed on the fabric surface until heated to ~40–50 C., the drop was then soaked into the fabric, | No ink bleeding, relatively high color saturation |
| 9 | 89 | Solvent drop stayed on the fabric surface until heated to ~40–50 C., the drop then soaked into the fabric. | Slight ink bleeding. |
| 10 | 0 | Solvent drop soaked instantly into the fabric. | A large spread with low color intensity. |
| 11 | 0 | Solvent drop soaked into the fabric. | Some ink bleeding. |

**base fabric is a polyester poplin with more texture.

Observation of Ink Fabric Interaction

Ink-fabric interaction test methods as described earlier were used. Qualitative observation was recorded and the results was summarized in Table 1.

Solvent Ink Ink Jet Printing

For printing, an Arizona Digital Screen Press solvent-based ink jet printer was employed. This printer may be obtained from the Oce'-USA Holding, Inc., located at Chicago, Ill. This printer was loaded with Inkware™ Brand six (6) color, solvent-based inks to test print the coated textiles. Visual examination of print sharpness and color brightness was conducted to judge the overall print quality.

Untreated Fabric

In example 10 above, heavy ink bleeding and blurred print was observed.

Repearl F89™ Treatment

Very sharp print was observed in examples which employed Repearl F89™ (see examples 5, 6, 7 and 8 above)—even at relatively high ink volume. Relatively high color saturation was observed. Thus it appears that compositions which employ a fluoroalkyl urethane emulsion are particularly well suited for applications in practice of the invention.

Repearl F8025™/Rhoplex K3™ Treated Fabric

Very sharp print was obtained in example 5 above with no noticeable ink bleeding. However, the color observed was not as bright as the print on the examples 6, 7 and 8.

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. An ink jet printing method comprising the steps of:
   (a) providing a porous substrate;
   (b) applying a fluorocarbon-containing repellant composition upon said porous substrate to form a coating upon said substrate, said substrate being adapted for providing with butoxyethyl acetate a contact angle of between about 40 and about 90 degrees at ambient temperature; and
   (c) applying with an ink jet printer organic solvent-based ink upon said coated substrate.

2. The method of claim 1 comprising the additional steps of:
   (d) heating said substrate; and
   (e) producing a fixed printed image upon said substrate.

3. A method for preparing a substrate to receive an organic solvent-based ink, said method comprising the steps of:
   (a) providing a substrate;
   (b) applying to said substrate a repellant composition, and
   (c) forming a repellant coating upon said substrate, said coating being capable of providing a contact angle for a solvent-based ink droplet of between about 70 and 85 degrees at ambient temperature.

4. The method of claim 3 wherein said repellant composition comprises:
   an organic solvent, and
   a fluorocarbon-containing polymer.

5. The method of claim 4 wherein said fluorocarbon-containing polymer comprises a fluoroalkyl urethane.

6. The method of claim 4 wherein said fluorocarbon-containing polymer comprises:

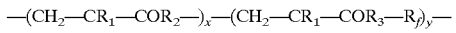

wherein $R_1$ is selected from the group consisting of: aliphatic radicals, halogen-containing radicals, nitrogen-containing radicals, sulfur-containing radicals, oxygen-containing radicals and aromatic radicals;

wherein $R_2$ is selected from the group consisting of alkyls, aromatic groups, oxygen-containing radicals, sulfur-containing radicals, and nitrogen-containing radicals;

wherein $R_3$ is selected from the group consisting of alkyls, aryls, sulfur-containing radicals, oxygen-containing radicals, nitrogen-containing radicals, phosphorous-containing radicals, and silicon-containing radicals;

wherein x is greater than or equal to 1; and wherein y is greater than or equal to 10.

7. The method of claim 4 wherein the fluorocarbon-containing polymer comprises a compound selected from the group consisting of: perfluorinated acrylates, acrylic emulsions, perfluoroacrylate latex materials, fluorinated urethanes, ureas, esters, ethers, alcohols, epoxides, allophanates, amides, amines, acids, and carbodiimides.

8. A textile printing process comprising the steps of:
   (a) providing a substrate for organic solvent-based ink jet printing;
   (b) applying to said substrate a fluorocarbon-containing urethane polymeric composition, thereby forming a coated substrate;
   (c) forming upon said coated substrate a level of repellancy which is effective to support solvent-based ink droplets at an effective contact angle at ambient temperature; and
   (d) applying solvent-based ink upon said coated substrate, thereby forming an image upon said coated substrate.

9. The process of claim 8 wherein the forming step (c) includes providing a coated substrate having a repellancy to solvent revealing a contact angle in the range of about 40–80 degrees at ambient temperature.

10. The process of claim 8 comprising the additional step of:
    (e) heating said substrate; and
    (f) evaporating solvent from said substrate, thereby producing a printed image upon said substrate.

11. The process of claim 10 wherein said heating step is applied at a temperature range of less than about 60 degrees Centigrade.

12. The process of claim 10 comprising the additional step of:
    (g) curing said solvent-based ink with ultraviolet radiation.

13. A method of forming a printing substrate comprising the steps of:
    providing a porous substrate having a first surface;
    applying to said first surface a fluorocarbon-containing repellant composition, thereby forming a coated substrate surface, said coated substrate surface having a butoxyethyl acetate contact angle repellancy of between about 40 and about 90 degrees at ambient temperature.

14. The method of claim 13 comprising the additional step of:
    applying to said coated substrate surface an organic solvent-based ink, thereby forming an image upon said first surface.

15. The method of claim 13 wherein said fluorocarbon-containing repellant composition additionally comprises an acrylate-based latex material.

16. The method of claim 13 wherein said coated substrate surface reveals a contact angle in the range of between about 60 and about 80 degrees.

17. The method of claim 13 wherein said coated substrate surface is adapted for supporting in an unabsorbed manner an organic solvent-based ink droplet upon said coated substrate surface at temperatures below about 35 degrees Centigrade.

18. The method of claim 13 wherein said porous substrate is air permeable and is comprised substantially of fibers, said fibers being selected from the group of fibers consisting of: polyester, nylon, acrylic, polyolefin, glass, acetate, polyaramide, polyketone, rayon, cotton, wool, and silk.

19. The method of claim 13 wherein said fluorocarbon-containing repellant composition comprises a fluorinated urethane polymer.

20. The method of claim 19 wherein said fluorinated urethane polymer comprises a fluoroalkyl urethane oligomer polymer emulsion.

21. The method of claim 13 wherein said fluorocarbon-containing repellant composition comprises:

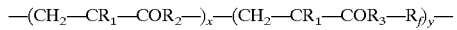

wherein $R_1$ is selected from the group consisting of: aliphatic radicals, halogen-containing radicals, nitrogen-containing radicals, sulfur-containing radicals, oxygen-containing radicals and aromatic radicals;

wherein $R_2$ is selected from the group consisting of alkyls, aromatic groups, oxygen-containing radicals, sulfur-containing radicals, and nitrogen-containing radicals;

wherein $R_3$ is selected from the group consisting of alkyls, aryls, sulfur-containing radicals, oxygen-containing radicals, nitrogen-containing radicals, phosphorous-containing radicals, and silicon-containing radicals;

wherein x is greater than or equal to 1; and wherein y is greater than or equal to 10.

22. A method of forming an image upon a solvent-based ink jet printed article, comprising the steps of:

(a) providing a substrate having a first surface;

(b) applying to said first surface a fluorocarbon-containing repellant composition, thereby forming a coated substrate surface, said coated substrate surface having a contact angle to printing solvent of between about 40 and about 90 degrees at ambient temperature;

(c) applying an organic solvent-based ink upon said coated substrate surface;

(d) heating said first surface of said substrate;

(e) facilitating the entry of solvent-based ink into said coated substrate surface; and (f) producing an image upon said coated substrate surface.

23. The method of claim 22 wherein said organic solvent-based ink comprises a solvent selected from the group consisting of: butoxyethyl acetate, cyclohexanone, dipropylene glycol, monomethyl ether, and propylene glycol monomethyl ether acetate.

24. The method of claim 23 wherein said organic solvent-based ink additionally comprises a pigment.

25. The method of claim 24 wherein said organic solvent-based ink additionally comprises a resin-based binder.

26. The method of claim 22 wherein said organic solvent-based ink additionally comprises an ultraviolet curable monomer or oligomer.

27. The method of claim 22 wherein said fluorocarbon-containing repellant composition comprises a fluorocarbon polymer having the structure:

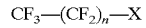

wherein n greater than or equal to 1; and wherein X is comprised of a carbon-containing composition.

28. The method of claim 22 wherein said fluorocarbon-containing repellant composition is a fluoroalkyl urethane oligomer polymer emulsion.

29. The method of claim 22 wherein said fluorocarbon-containing composition comprises:

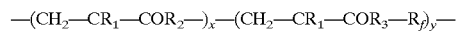

wherein $R_1$ is selected from the group consisting of: aliphatic radicals, halogen-containing radicals, nitrogen-containing radicals, sulfur-containing radicals, oxygen-containing radicals and aromatic radicals;

wherein $R_2$ is selected from the group consisting of alkyls, aromatic groups, oxygen-containing radicals, sulfur-containing radicals, and nitrogen-containing radicals;

wherein $R_3$ is selected from the group consisting of alkyls, aryls, sulfur-containing radicals, oxygen-containing radicals, nitrogen-containing radicals, phosphorous-containing radicals, and silicon-containing radicals;

wherein x is greater than or equal to 1; and wherein y is greater than or equal to 10.

30. The method of claim 22 wherein said fluorocarbon-containing repellant composition comprises a polyurethane-containing species.

31. The method of claim 22, wherein said fluorocarbon-containing polymer is selected from the group consisting of: perfluorinated acrylates, acrylic emulsions, perfluoroacrylate latex materials, fluorinated urethanes, ureas, esters, ethers, alcohols, epoxides, allophanates, amides, amines, acids, carbodiimides, guanidines, oxazolidinones, isocyanurates, and biurets.

32. The method of claim 31 wherein said fluorocarbon-containing polymer comprises a fluorinated urethane, said fluorinated urethane being a fluoroalkyl urethane oligomer polymer emulsion having a total fluorine content of at least about 8%.

33. The method of claim 22 wherein said contact angle is measured using butoxyethyl acetate, said contact angle further being between about 60 and about 80 degrees.

* * * * *